(12) United States Patent
Gonczi

(10) Patent No.: US 6,176,640 B1
(45) Date of Patent: Jan. 23, 2001

(54) TUBULAR COMPOSITE STRUCTURAL PARTS HAVING CLAMP AREA CONFIGURATION TO PREVENT CRACKING UNDER CLAMPING STRESS

(75) Inventor: Robert Gonczi, Van Nuys, CA (US)

(73) Assignee: Jas. D. Easton, Inc., Van Nuys, CA (US)

(*) Notice: Under 35 U.S.C. 154(b), the term of this patent shall be extended for 0 days.

(21) Appl. No.: 09/353,523

(22) Filed: Jul. 14, 1999

(51) Int. Cl.[7] .................................................. F16B 2/08
(52) U.S. Cl. ..................... 403/375; 403/12; 403/374.3; 403/377
(58) Field of Search ................... 403/383, 375, 403/373, 374.2, 374.3, 374.1, 365, 11, 12, 109.4, 109.5, 110, 377; 280/287; 285/373, 419; 297/195.1

(56) References Cited

U.S. PATENT DOCUMENTS

| | | |
|---|---|---|
| 631,535 | 8/1899 | Waitt . |
| 670,040 | 3/1901 | Thompson . |
| 1,204,329 | 11/1916 | Wilkins . |
| 1,328,092 | 1/1920 | Maltry et al. . |
| 2,358,737 | 9/1944 | Schwinn . |
| 2,650,119 | 8/1953 | Booth et al. . |
| 2,710,207 | 6/1955 | Mueller . |
| 2,770,479 | 11/1956 | Hilber . |
| 2,825,080 | 3/1958 | Bongiovanni . |
| 3,720,430 | 3/1973 | St. Paul ........................ 403/118 X |
| 3,994,177 | 11/1976 | Cappelle et al. ................ 74/10 R X |
| 4,006,993 | 2/1977 | Woerlee ........................ 403/359 X |
| 4,111,575 | 9/1978 | Hoshino ........................ 403/104 X |
| 4,300,792 | * 11/1981 | Donnelly ....................... 285/373 X |
| 4,371,355 | 2/1983 | Baumann ....................... 464/101 X |
| 4,575,277 | 3/1986 | Dickey et al. .................. 403/361 X |
| 4,616,949 | 10/1986 | Kellner ......................... 403/104 X |
| 4,915,538 | 4/1990 | Golden et al. .................. 403/362 X |
| 5,069,054 | 12/1991 | Hladky et al. .................. 72/238 X |
| 5,096,327 | 3/1992 | Ruland ......................... 403/290 X |
| 5,139,358 | 8/1992 | Kodama et al. ................. 403/7 X |
| 5,249,881 | 10/1993 | Austin , Jr. et al. ............ 403/378 X |
| 5,251,995 | 10/1993 | Chi ............................. 403/320 X |
| 5,351,980 | 10/1994 | Huang .......................... 280/281.1 X |
| 5,356,237 | 10/1994 | Sung ........................... 403/374.3 |
| 5,404,769 | 4/1995 | Kao ............................. 74/551.3 X |
| 5,588,336 | 12/1996 | Chou ............................ 74/551.1 X |
| 5,683,201 | 11/1997 | Guaron ......................... 403/325 X |
| 5,762,402 | 6/1998 | Gillotti ....................... 297/423.11 X |
| 5,873,210 | 2/1999 | Brumleve ....................... 52/735.1 X |
| 5,931,598 | 8/1999 | Wang ........................... 403/351 X |
| 5,951,034 | 9/1999 | Mayo ........................... 280/288.1 X |

FOREIGN PATENT DOCUMENTS

| | | |
|---|---|---|
| 2061308 | 6/1972 | (DE) . |
| 2735875 | 2/1978 | (DE) . |
| 344191 | 10/1904 | (FR) . |
| 662412 | 5/1979 | (SU) . |

* cited by examiner

*Primary Examiner*—Harry C. Kim
(74) *Attorney, Agent, or Firm*—Roth & Goldman

(57) ABSTRACT

A tubular structural part made of composite material such as carbon strand reinforced epoxy resin is provided with an elongated flat area along the outer surface of the tubular part to avoid cracking of the part when the part is telescopically engaged with and clamped in an outer tube part. The flat clamp side area of the inner tube part prevents contact between the facing edges of an elongate split in the outer tube part which are drawn together during clamping so that the edges of the outer tube part are prevented from coming into contact with and thus gouging the outer surface of the composite tube causing cracks and eventual structural failure of the inner tube.

9 Claims, 1 Drawing Sheet

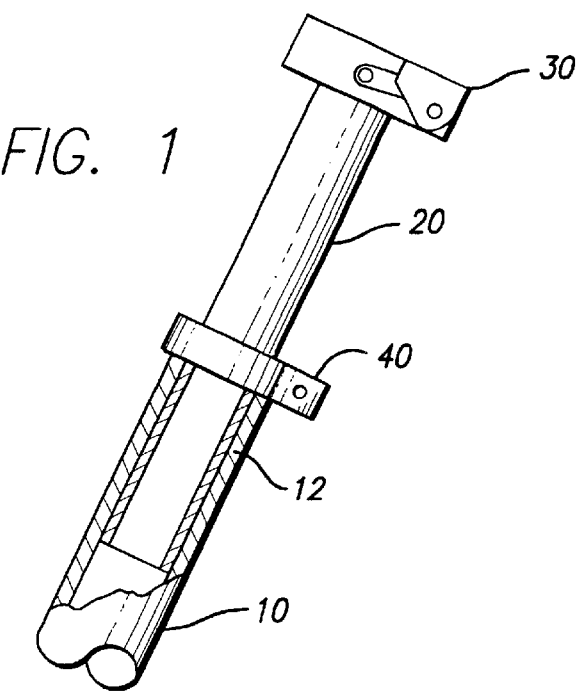
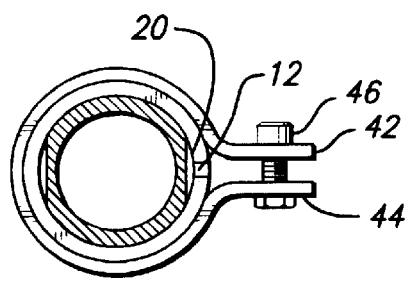
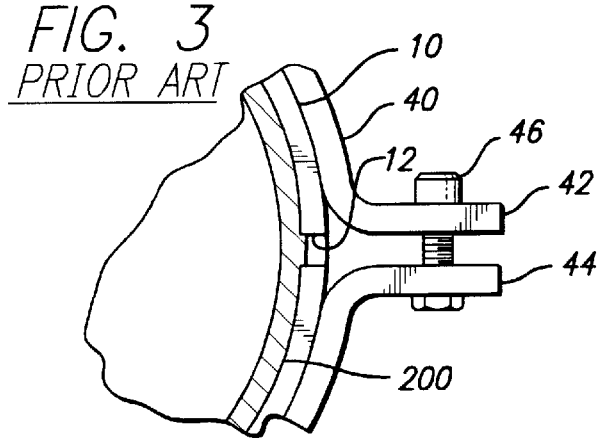
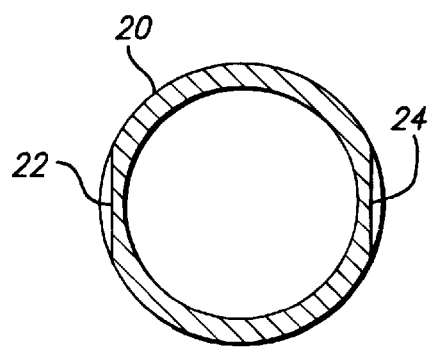
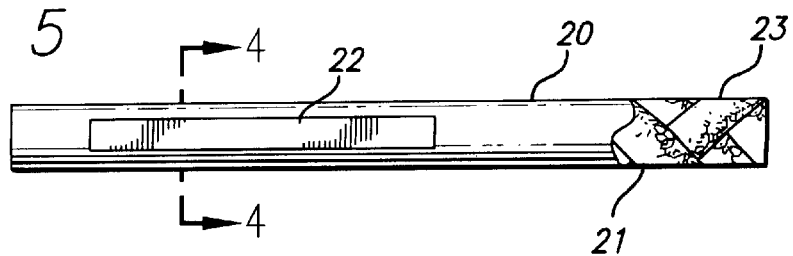

TUBULAR COMPOSITE STRUCTURAL PARTS HAVING CLAMP AREA CONFIGURATION TO PREVENT CRACKING UNDER CLAMPING STRESS

CROSS REFERENCE TO RELATED APPLICATIONS, IF ANY

None.

BACKGROUND OF THE INVENTION AND PRIOR ART

1. Field of the Invention

The present invention relates to the manufacture of high performance bicycle components and, more specifically, to prevention or minimization of cracking of tubular components due to stresses induced therein by clamps.

2. Prior Art

High performance cycling requires a frame and other components of a bicycle to possess strength, rigidity, and light weight. As is well known, tubular bicycle frames and parts thereof, handlbars, seat posts and other structural components of bicycles and other structures may be made of metal or metal alloys such as steel, aluminum and titanium or they may be made of high strength composites such as carbon or fiberglass reinforced cured resins. In some instances metal tubes may have a composite outer layer bonded thereto. Tubular structural members that are manufactured from composite materials are particularly subject to damage due to clamping since clamping of an end of an inner tube such as a bicycle seat post, handlebar stem or handlebars into an outer tube which is compressed by a C-shaped clamp has been found to quickly destroy the structural integrity of composites through gouging, fretting and point loading. One manner of addressing this problem is through the use of a double articulated clamp such as a two hinge pin clamp for a bicycle handlebar as disclosed in U.S. patent application Ser. No. 09/150,626 by Osborne and owned by the assignee of the present invention.

OBJECT OF THE INVENTION

The primary objective of the present invention is to provide high strength light weight tubular composite structural parts in which the incidence of cracking due to clamping stresses of telescopically clamped parts is significantly reduced.

SUMMARY OF THE INVENTION

The present invention accordingly provides a tubular composite structural inner tube part having a convex surface area engageable with a concave surface of an outer tube part which has a split having facing edges which are drawn together during clamping to telescopically fasten said inner tube part to an outer tube part, said convex surface area of said inner tube part having a clamp side area to be positioned between the facing edges of said outer tube split in the area of an outer tube clamp such that said facing edges of said outer tube split do not engage said clamp side area of said inner tube part during clamping.

BRIEF DESCRIPTION OF THE DRAWINGS

FIG. 1 is a partial side elevation view of a bicycle frame having a seatpost quill clamped therein.

FIG. 2 is a top plan view of a generally C shaped clamp, frame and seatpost quill.

FIG. 3 is a view like FIG. 2 drawn to an enlarged scale to illustrate gouging of a prior art seatpost quill.

FIG. 4 is an end view of a seatpost quill constructed in accordance with the teachings of the present invention.

FIG. 5 is a side view of the seatpost quill of FIG. 4.

DESCRIPTION OF THE PREFERRED EMBODIMENT

Although the invention has broad applicability to the connection of a variety of telescopically engaged tubes held together by an outer generally C-shaped clamp, the invention is described with specific reference, for convenience, to the telescopic interconnection of a bicycle seat post or quill with the bicycle frame in which the quill is received. As seen in FIG. 1, an outer tube 10, comprising part of the bicycle frame, telescopically receives an inner tube 20 in the form of a bicycle seat post, the inner diameter of the outer tube approximating the outer diameter of the seat post to provide a close sliding fit. The frame tube 10, which may be made of metal or composite material or a combination thereof, has a longitudinally extending split 12 therein to permit the spaced edges of the split in the outer tube 10 to be drawn together by a C-shaped clamp. The inner tube 20, in the form of a bicycle seat post, includes a seat receiving head 30 at the upper end thereof which may be permanently connected to the inner tube 20 in any convenient fashion. The inner tube 20 is entirely formed of a composite material such as carbon fiber reinforced epoxy resin or it may comprise a layered tube having a metal inner layer covered by an outer surface layer or layers 21, 23 (FIG. 5) formed of composite material.

As seen in FIG. 2, the C-shaped clamp 40 has a pair of spaced ears 42, 44 which are drawn together during clamping by a threaded fastener 46 as is well known.

Particularly pursuant to the present invention, the inner tube 20 of the pair of tubes to be clamped together includes at least one elongated flat 22, 24, one being provided on each diametrically opposed side of the tube 20. As seen in FIG. 2, the operational flat 22 is positioned next to the split 12 in the outer tube 10 so that the spaced edges on opposite sides of the split 12 of the outer frame tube 10 never contact the outer surface of the seat post or inner tube 10. Thus, the flat 22 provides a clamp side area to be positioned in radial alignment with the space between the facing edges of the split 12 in the frame tube 10 such that the facing edges of the split in the frame tube 10 do not come into contact with or otherwise engage the clamp side area 22 of the inner seat post tube 20. The length of the flat or flats 22, 24 is selected to approximate the length of adjustability of the elevation of a bicycle seat (not shown) to be fastened to the head 30. Although the clamp side area or areas 22, 24 are shown in the preferred embodiments as flat surfaces, and the inner and outer tubes 10, 20 are shown as round tubes, it will be appreciated that the clamp side areas 22, 24 need not be flat nor need the tubes 10, 20 be round. The clamp side area or areas 22, 24 are conveniently formed during molding of the composite seat post tube 20.

As is known in the art, composite bicycle seat posts are comprised of a plurality of composite layers to form the tubular shape and the composite layers usually have reinforcing strands therein arranged at differing angles with respect to the longitudinal axis of the seat post tube 20. Preferably, at least some of the layers 21, 23 of the composite seat post tube are made of carbon reinforced epoxy resin.

Referring to FIG. 3 which shows a prior art bicycle seat post 200 not provided with a clamping area 22 pursuant to the invention, it can be seen that the spaced edges of the split 12 in the outer frame tube 10 gouge into the outer surface of the prior art inner seat post tube 200 as the clamp 40 is tightened. Microscopic examination of prior art seat posts has revealed cracking that takes place in this specific area, the cracks generally extending longitudinally of the seat post through the area of clamping and then extending in random directions as the cracks extend in length away from the area of the clamp 40. This discovery has lead to the development of the invention wherein a flat clamp side area 22 has been provided to ensure that the edges of the split 12 do not dig into and gouge the outer surface of the composite seat post tube 20 during tightening of the clamp fastener 46. Although seat posts may be made of slightly different diameters, it has been found that the radial distance between the center point of a chord which extends through the clamp side area 22 and the normal outer diameter of the seat post of about 0.50 mm functions adequately well to prevent or at least minimize cracking and thus substantially improve the strength of the tube 20 in the area referred to above. The provision of two diametrically spaced generally flat areas 22, 24 during molding of the seat post is preferable to provide a symmetry which is useful in manufacturing and assembly of other parts to a bicycle seat post such as the head 30 which may also be clamped to the seat post 20 in a fashion similar to the manner in which the seat post is clamped into the frame tube 10.

Stress testing of a variety of composite seat posts clamped into outer frame tubes 10 formed of steel, titanium and other material involves tightening of the threaded fastener 46 of the clamp 40 sufficiently to cause cracking in the seat post tube. Seat post tubes not having the clamp side area 22 of the present invention exhibit significant cracking or other damage when torque as low as 130 inch pounds is applied in tightening the fastener 46. All of the prior art seat posts tested exhibited cracking at no more than 200 inch pounds of clamping torque. In comparison, no cracks were exhibited in seat posts produced according to the present invention when as much as 250 inch pounds of torque was applied to the clamp fastener 46. It has thus been found that the provision of a flat or other suitably configured clamp side area 22 constructed as shown which prevents contact between the edges of the split 12 in the frame tube 10 which receives the seat post and the outer surface of the seat post tube 20 clamped therein significantly reduces failure of the seat post tube 20 due to cracking resulting from excessive torque applied to the clamp fastener 46.

Composite tubular parts as described intended to be clamped in outer tubes may be formed in a mold using an inflatable mandrel to urge the composite layers of the part into engagement with the inner surfaces of the mold.

Persons skilled in the art will appreciate that various modifications of the invention can be made from the above described preferred embodiment and that the scope of protection is limited only by the following claims.

What is claimed is:

1. A tubular connection comprising:
   a) an inner tube formed of composite material, said inner tube having a convex outer surface;
   b) an outer tube having a concave inner surface telescopically engaged with said outer surface of said inner tube, said outer tube having a split providing facing edges which are moved together during clamping; and
   c) an outer tube clamp, said composite inner tube having a clamp side area which is recessed from said convex outer surface positioned in radial alignment with a space between said facing edges of said split and said outer tube clamp such that said facing edges do not engage said clamp side area of said inner tube during tightening of said clamp.

2. The connection of claim 1, wherein said clamp side area is substantially flat.

3. The connection of claim 2, further comprising two of said clamp side areas on diametrically opposed sides of said inner tube.

4. The connection of claim 2, wherein said inner tube comprises a cycle seat post quill and said outer tube comprises a portion of a cycle frame, said clamp side area having a center which is radially spaced from the outer diameter of said quill by about 0.50 mm.

5. The connection of claim 1, wherein said inner tube is comprised of a plurality of composite layers, said composite layers having reinforcing strands arranged at differing angles with respect to a longitudinal axis of said inner tube.

6. The connection of claim 5, wherein at least one of said layers of composite is carbon reinforced epoxy resin.

7. The connection of claim 5, wherein said inner tube has a round cross-section with the exception of said clamp side area.

8. The connection of claim 7, wherein said composite inner tube and clamp area thereon are formed by molding.

9. The connection of claim 1, wherein said clamp includes a threaded fastener.

* * * * *